United States Patent
Marable et al.

(10) Patent No.: US 8,065,931 B1
(45) Date of Patent: Nov. 29, 2011

(54) ADJUSTABLE STEERING COLUMN ASSEMBLY FOR A MOTOR VEHICLE

(75) Inventors: Paul Mark Marable, Rayleigh (GB); Marcus John Scott Ward, Billericay (GB); Timothy Scott, Benfleet (GB); Gregor Whelan, Great Dunmow (GB)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 13/185,826

(22) Filed: Jul. 19, 2011

Related U.S. Application Data

(62) Division of application No. 12/183,360, filed on Jul. 31, 2008, now Pat. No. 8,056,436.

(30) Foreign Application Priority Data

Aug. 2, 2007 (GB) .................. 0715032.9

(51) Int. Cl.
*B62D 1/18* (2006.01)
*B62D 1/00* (2006.01)
(52) U.S. Cl. .......................... 74/493; 280/775
(58) Field of Classification Search ........... 74/492, 74/493, 494; 280/775, 777
See application file for complete search history.

(56) References Cited

U.S. PATENT DOCUMENTS

| | | | |
|---|---|---|---|
| 4,307,626 A | 12/1981 | Sanada et al. |
| 4,541,298 A | 9/1985 | Strutt |
| 4,901,592 A | 2/1990 | Ito et al. |
| 5,213,004 A | 5/1993 | Hoblingre |
| 5,961,146 A | 10/1999 | Matsumoto et al. |
| 6,467,807 B2 | 10/2002 | Ikeda et al. |
| 6,596,079 B1 | 7/2003 | Vaudo et al. |
| 6,942,250 B2 | 9/2005 | Dubay et al. |
| 7,322,608 B2 | 1/2008 | Yamamoto et al. |
| 7,780,196 B2 | 8/2010 | Cymbal et al. |
| 2004/0090057 A1 | 5/2004 | Bechtel et al. |

FOREIGN PATENT DOCUMENTS

| | | | |
|---|---|---|---|
| GB | 2033855 A | 5/1980 |
| GB | 2368819 A | 5/2002 |
| GB | 2403692 A | 1/2005 |

*Primary Examiner* — Justin Krause
(74) *Attorney, Agent, or Firm* — Angela M. Brunetti; Frank MacKenzie

(57) ABSTRACT

A steering column assembly for a motor vehicle is disclosed having lower and upper steering column members that are slidingly interengaged. The upper column member is attached to a structural part of the motor vehicle by a ride down mechanism that allows the upper steering column to move in the event of a collision. A load transfer means is provided to bypass the ride down mechanism when an adjustment lever is moved to a position allowing the position of the upper steering column member to be adjusted thereby preventing accidental damage occurring to the ride down mechanism due to operator abuse.

8 Claims, 4 Drawing Sheets

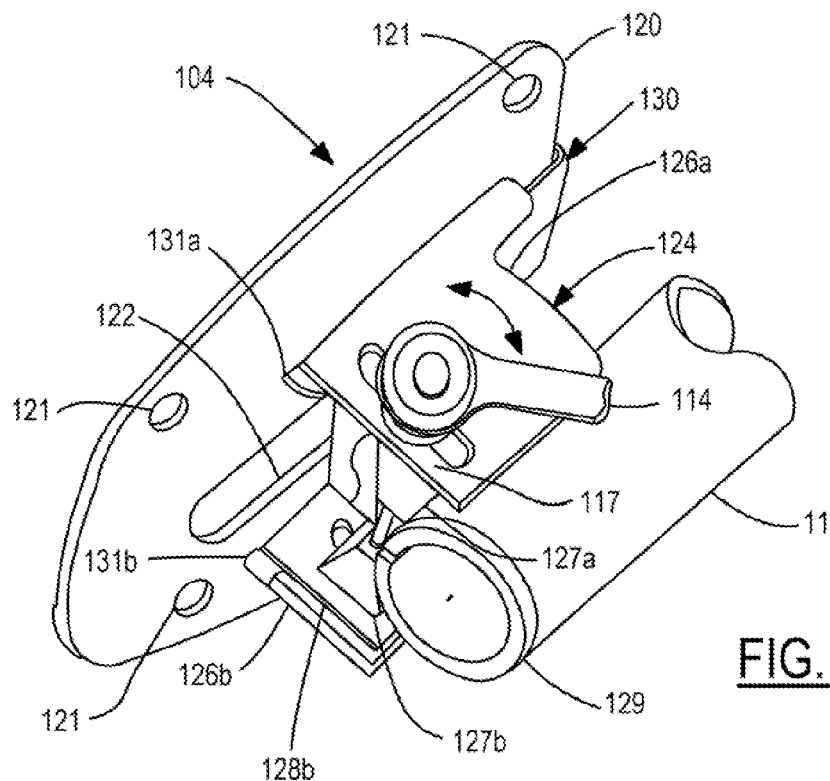
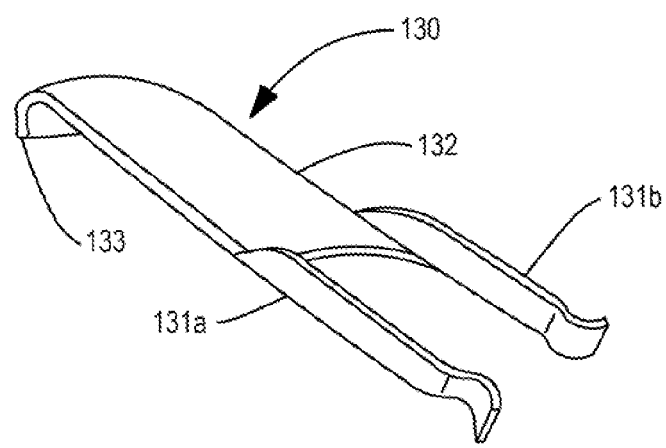
FIG. 4
FIG. 5
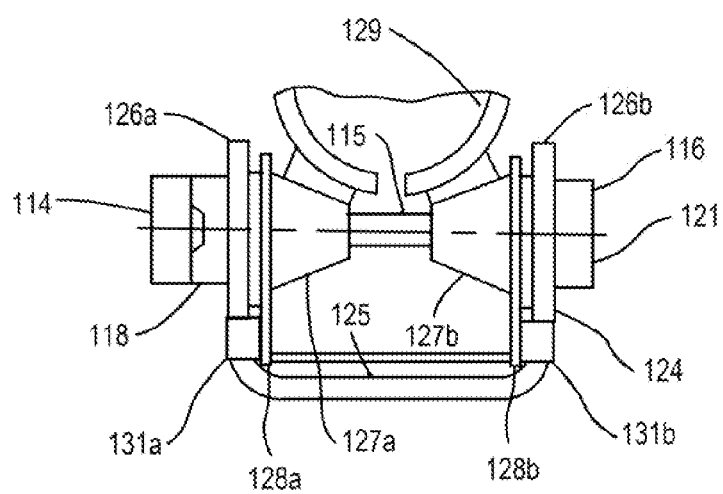
FIG. 6

ADJUSTABLE STEERING COLUMN ASSEMBLY FOR A MOTOR VEHICLE

CROSS REFERENCE

This application is a divisional of co-pending U.S. application Ser. No. 12/183,360 filed on Jul. 31, 2008, herein incorporated by reference.

FIELD OF THE INVENTION

This invention relates to an adjustable steering column assembly for a motor vehicle and in particular to an adjustable steering column assembly for a motor vehicle having an improved ride down mechanism to permit limited collapse of the steering column assembly during a crash.

BACKGROUND

It is known from, for example, GB-A-2,368,819 to provide a ride down mechanism for a steering column assembly comprising a mounting plate for fastening to part of a body structure of a motor vehicle and a skid bracket fastened to the mounting bracket by a pair of threaded fastening means which are engaged with an elongate slot in the mounting plate. The advantage of such an arrangement is that the force required to produce relative sliding between the skid bracket and the mounting plate is set by the torque applied to the threaded fastening means and, by careful tightening of the fastening means, the force required to produce collapse of the ride down mechanism can be accurately set to a relatively low level so that in the event of an accident the steering column is readily collapsed.

It is however a problem with such an arrangement that abuse loads input by an operator of the motor vehicle, particularly during adjustment of the position of the steering column assembly, may allow the fastening means to loosen thereby reducing the clamping force with adverse effects on both collapse performance and perceived quality due to steering column rattle. It is also a potential problem with such an arrangement that partial collapse of the ride down mechanism can be produced if very high abuse loads are applied during adjustment of the steering column and this could have an adverse effect in the event of a crash due to the reduced ride down travel remaining in the ride down mechanism.

It has therefore been proposed to use a ride down mechanism as shown in FIGS. 2 and 3. The ride down mechanism comprising of a mounting plate 20 having four holes 21 therein to secure it to a cross car beam (not shown) and a carriage member 24 which is clamped to the mounting plate 20 by a threaded fastener (not shown) that is engaged with a longitudinal slot 22 in the mounting plate 20 and an aperture 28 in a skid plate 25 part of the carriage 24.

The carriage 24 also has two side plates 26a, 26b in each of which is formed a hole 27 used to support the shaft of an adjustment lever (not shown). Two capsules 29a, 29b are fastened to the skid plate 25 part of the carriage 24 for engagement with recesses 23a, 23b in a rear edge of the mounting plate 20.

The capsules 29a, 29b prevent the movement of the fastener in the slot 22 and therefore prevent loosening of the fastener due to abuse loads input by an operator of the motor vehicle and also prevent loss of ride down travel due to abuse loading.

In the event of a crash, the force applied to the steering column is sufficient to shear the capsules 29a, 29b off the skid plate 25 thereby allowing the skid plate 25 to slide along the mounting plate 20 against the resistance to motion produced by the clamping force therebetween due to the threaded fastener.

It is however a disadvantage with such an arrangement that a relatively high force has to be input into the capsules in order to shear them off because their fixing must be made sufficiently secure to resist any abuse loads transferred during adjustment of the steering column. In the event of a crash this is undesirable because it produces a skewed resistance in which there is a peak in resistance force at the commencement of impact (due the additional force needed to shear off the capsules) followed by a sudden drop to a lower more acceptable resistance after the capsules have been sheared off. This can result in a high occupant retardation rate during initial impact which is not beneficial to the occupant impacting upon the steering column.

It is an object of this invention to provide a ride down mechanism for a steering column assembly that overcomes at least some of the disadvantages associated with the prior art.

According to the invention there is provided an adjustable steering column assembly for a motor vehicle characterised in that the assembly comprises a lower column member slidingly engaged at one end with an upper column member, a ride down mechanism connecting the upper column member to a fixed part of the motor vehicle so as to permit ride down of the upper column member when a force above a predetermined level is applied to the upper column member, an adjustment mechanism having a locked state in which the upper column member is secured in one of a number of positions and an unlocked state in which the upper column member can be moved by an operator within a predetermined range of movement wherein when the adjustment mechanism is in the unlocked state a load transfer means is engaged to bypass the ride down mechanism so as to prevent the transfer of axial load from the upper column member through the ride down mechanism during adjustment of the upper column member.

The ride down mechanism may comprise a mounting bracket fixed to part of the body structure of the motor vehicle, a carriage connected to the upper column member, a clamping means to apply a predetermined clamping force between the mounting bracket and the carriage so as to inhibit relative sliding between the carriage and the mounting bracket during normal use but allowing relative movement between the carriage and the mounting bracket when an axial force above a predetermined magnitude is applied to the upper column member in the event of a vehicle crash wherein the clamping means is a fastener passing through an aperture in one of the carriage and the mounting bracket and a longitudinal slot in the other of the carriage and the mounting bracket so as to provide a slideable connection therebetween.

Preferably, the fastener may be a threaded fastener that is tightened to provide a desired clamping force.

The carriage may be connected to the upper column member by two rack and pinion sets the racks of which are fastened to the upper column member and the pinions of which are mounted on the shaft the pinions being engageable with the racks to secure the upper column member in one of its adjustment positions.

The load transfer means may comprise a detent that is engaged with the lower column member when the adjustment mechanism is in the unlocked state and which is retracted when the adjustment mechanism is in the locked state.

The detent may engage with one of an aperture in the lower column member and a recess in the lower column member.

The steering column assembly may be a telescopically adjustable steering column assembly and the aperture is a slot of sufficient length to permit the upper column member to move throughout a normal range of travel but acting so as to transfer load directly from the upper column to the lower column member when the upper column member reaches either end of its normal range of travel.

The steering column assembly may be a telescopically adjustable steering column assembly and the recess may be an elongate recess of sufficient length to permit the upper column member to move throughout a normal range of travel but acting so as to transfer load directly from the upper column to the lower column member when the upper column member reaches either end of its normal range of travel.

Alternatively, the load transfer means may comprise a detent that interacts with the mounting bracket when the adjustment mechanism is in the unlocked state so as to prevent relative movement between the carriage and the mounting bracket and is retracted when the adjustment mechanism is in the locked state so as to permit relative movement between the carriage and the mounting bracket when an axial force above the predetermined magnitude is applied to the upper column member in the event of a vehicle crash.

The detent may interact with the mounting bracket by engaging with one of a flange formed as part of the mounting bracket and an aperture in the mounting bracket.

The adjustment mechanism may include an operator operable lever connected to a shaft rotatably supported by the carriage and the detent may be driveably connected to the shaft.

The adjustment mechanism may include an operator operable lever connected to a shaft rotatably supported by the carriage and an abutment surface fastened to the shaft for rotation therewith and the load transfer means may comprise a detent in the form of an end stop wherein, when the operator operable lever is in a position corresponding to the unlocked state the end stop is co-operable with the abutment surface so as to transfer load directly from the upper column member to the end stop and, when the operator operable lever is in a position corresponding to the locked state, the end stop is non-engageable with the abutment surface so as to permit normal ride down to occur.

The abutment surface may be on a flange formed as part of the operator operable lever.

The end stop may be fastened to a bulkhead support used to support a lower end of the lower column member.

As yet a further alternative, the load transfer means may comprise a retention strap having one end connected to the mounting plate and at least one detent formed at an opposite end that interacts with the carriage when the adjustment mechanism is in the unlocked state so as to prevent relative movement between the carriage and the mounting bracket, the at least one detent being retracted when the adjustment mechanism is in the locked state so as to permit relative movement between the carriage and the mounting bracket when an axial force above the predetermined magnitude is applied to the upper column member in the event of a vehicle crash.

Preferably, the strap may have two detents for engagement with the carriage.

The strap may have two detents for interaction with the carriage and the two detents may interact with the carriage by one of spring biasing into contact therewith or positive clamping to the carriage.

The or each detent may be arranged to fail when a force greater than a predetermined force is applied to it so as to facilitate normal functioning of the ride down mechanism in the event of a vehicle crash with the adjustment mechanism in the unlocked state.

DESCRIPTION OF THE DRAWINGS

The invention will now be described by way of example with reference to the accompanying drawing of which:

FIG. 4 is a pictorial representation of a ride down mechanism according to a first embodiment of the invention;

FIG. 5 is a pictorial view of a retention strap forming part of the ride down mechanism shown in FIG. 4;

FIG. 6 is an upside down end view of part of the ride down mechanism shown in FIG. 4 drawn so as to correspond with the orientation of the retention strap shown in FIG. 5;

FIG. 7b is a scrap view in the direction of arrow "P" on FIG. 7a;

DETAILED DESCRIPTION

Figure 1:
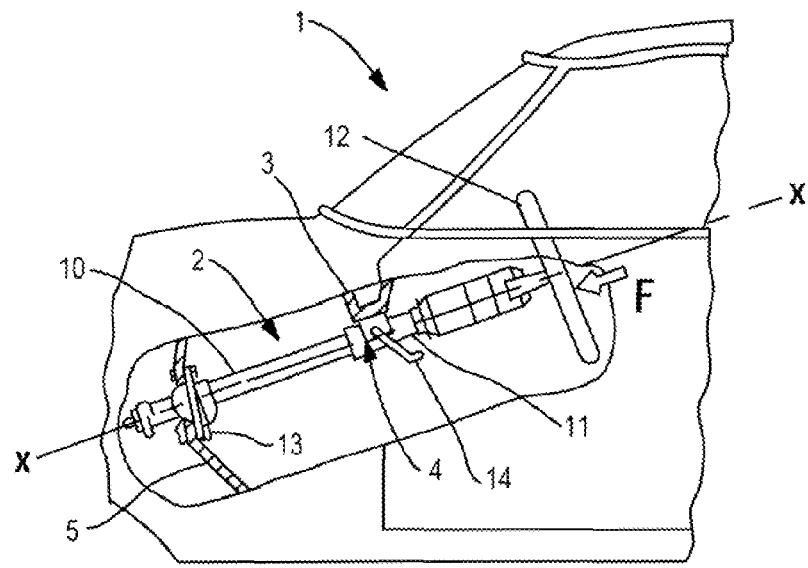
FIG. 1 is a schematic view of a motor vehicle having an adjustable steering column and a ride down mechanism.
Figure 2:
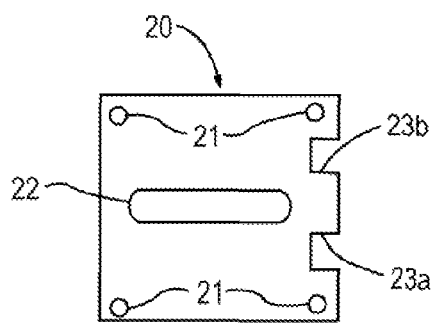
FIG. 2 is a plan view of a mounting plate forming part of a prior art ride down mechanism.

With reference to FIG. 1 there is shown a motor vehicle 1 having an adjustable and collapsible steering column assembly 2. The steering column assembly 2 comprises of a tubular lower column member 10 slidingly engaged with a tubular upper steering column member 11. An upper drive shaft (not shown) is drivingly engaged with an upper end of the lower column member 10 by means of a spline drive therebetween. An upper end of the upper drive shaft has a steering wheel 12 fastened thereto and the upper drive shaft is rotatably supported by one or more bearings located in the upper column member 11. The lower end of the lower column member is connected to a bulkhead support 13 fastened to a bulkhead 5 of the motor vehicle 1. The bulkhead support 13 transfers rotary motion from the lower column member 10 to a lower drive shaft (not shown) connected to a steering rack (not shown). The bulkhead support 13 also resists axial movement of the lower column member 10 if an axial load "F" is applied along a longitudinal axis x-x of the lower column member 10 via the steering wheel 12.

The upper column member 11 is attached to a cross-member 3 of the motor vehicle 1 by means of a ride down mechanism 4 (which can be of any of the embodiments described herein with respect to the invention). The ride down mechanism is operable to permit the upper column 11 to move relative to the cross-member 3 when the load "F" applied to the steering wheel 12 exceeds a predetermined load such as will be the case when the motor vehicle 1 is involved in a frontal collision and an occupant impacts against the steering wheel or against an air bag fitted to the steering wheel 12.

An adjustment mechanism of any known type is incorporated into the ride down mechanism 4 so as to permit the position of the upper column member 11 to be moved into one of a number of positions by an operator of the motor vehicle 1. The steering column assembly 2 may be adjustable for reach, for rake or for reach and rake and is secured in any of its positions by operation of an operator operable lever 14.

Referring now to FIGS. 4 to 6, there is shown a first embodiment of a ride down mechanism which forms part of an adjustable steering column assembly according to the invention.

The ride down mechanism comprises of a mounting plate 120 having a number of apertures 121 therein used to fasten it to part of the body structure of the motor vehicle 1 such as the cross member 3. The mounting plate 120 has a longitudinally extending slot 122 therein which extends in the same direction as the intended direction of ride down.

Figure 3:
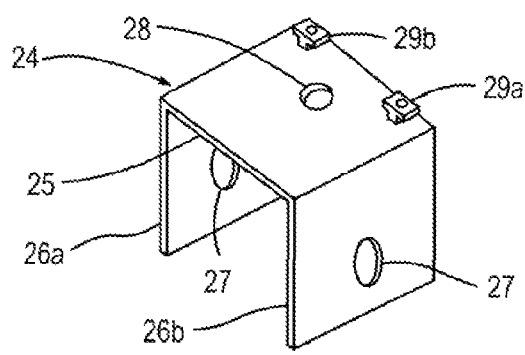
FIG. 3 is a pictorial view of a prior art carriage for cooperation with the mounting plate shown in FIG. 2.

A carriage 124 is clamped to the mounting plate 120 by means of a threaded fastener (not shown) which extends through an aperture (not shown) in a skid plate 125 part of the carriage 124. The skid plate 125 is bounded on each side by a side plate 126a, 126b and is U-shaped in cross-section. The carriage 124 is substantially the same as the prior art carriage 24 shown in FIG. 3 with the exception that no capsules are attached to it and the apertures 27 are elongate slots 117.

It will be appreciated that a sliding connection could also be obtained via a longitudinal slot in the carriage 124 and an aperture in the mounting plate 120 or by an arrangement having longitudinal slots in the mounting plate and the carriage 124.

An adjustment mechanism is incorporated with the ride down mechanism. The adjustment mechanism comprises of an elongate slot 117 in each of the side plates 126a, 126b in which is engaged a shaft 115 so that the shaft is rotatably supported by the carriage 124. An operator operable lever in the form of an adjustment lever 114 is connected to one end of the shaft 115 and the shaft ends in an enlarged head 116 at an opposite end. A cam plate 118 is interposed between the adjustment 114 and one of the side plates 126a such that rotation of the adjustment lever 114 relative to the cam plate 118 in one direction draws the two side plates 126a, 126b closer together to put the adjustment mechanism in a locked state and rotation of the adjustment lever 114 relative to the cam plate 118 in an opposite direction from the locked position allows the two side plates 126a, 126b to move apart to put the adjustment mechanism in an unlocked state.

Two clamp lugs 127a, 127b are fastened to a split bush 129 fastened to the upper column member 11. The lugs 127a, 127b have apertures through which the shaft 115 extends and are positioned between the two side plates 126a, 126b. A cantilever spring 128a, 128b is interposed between each of the clamp lugs 127a, 127b and the respective side plate 126a, 126b. The cantilever springs 128a, 128b have free ends which bear against legs 131a, 131b of a retention strap 130.

The retention strap 130 has a central body portion 132 terminating at one end in a hook 133 and is connected at an opposite end to the two legs 131a, 131b. It will be appreciated that the retention strap 130 is made from a single piece of material and is bent to form the hook 133 and the two legs 131a, 131b.

The hook 133 is used to connect the retention strap 130 to the mounting plate 120 but is will be appreciated that other means of connection could be used such as riveting or welding.

The two legs 131a, 131b are engageable with the side plates 126a, 126b when the adjustment lever 114 is moved to the unlocked state thereby preventing relative motion between the carriage 124 and the mounting plate 120 in a column collapse direction by transferring any load input into the upper column member 11 directly into the mounting plate 120 thereby bypassing the ride down mechanism. It will be appreciated that relative motion in an opposite direction is prevented by the position of the threaded fastener in the longitudinal slot 122.

That is to say, when the adjustment mechanism is locked the split bush 129 clamps the lower column member 10 to the upper column member 11 to prevent relative movement therebetween during normal use, the clamping force being set to provide a desired resistance to collapse and the retention strap 130 can move freely between the two cantilever springs 128a, 128b because the effect of clamping has removed the load from these and so there is no additional resistance to motion between the carriage 124 and the mounting plate 120. However, when the adjustment mechanism is in the unlocked state the cantilever springs 128a, 128b bias the legs 131a, 131b into engagement with the side plates 126a, 126b thereby preventing any movement of the carriage 124 relative to the mounting plate 120.

The two legs 131a, 131b therefore function as engageable detents which are arranged to fail when a load greater than a predetermined load is applied to them so as to facilitate normal functioning of the ride down mechanism in the event of a vehicle crash with the adjustment mechanism in the unlocked state. In this case, the detents fail by being pushed out of engagement with the carriage 124 when a force above the predetermined force is applied. The predetermined force is a force sufficient to counteract or overcome the spring force applied by the two cantilever springs 128a, 128b. It will be appreciated that other embodiments could be constructed in which the legs 131a, 131b could be designed to break when a force above the predetermined force is applied. The predetermined force will be a force greater than that expected due to operator abuse.

It will be appreciated that any suitable adjustment mechanism could be used and that the invention is not limited to use with the adjustment mechanism described above.

It will be further appreciated that instead of the cantilever springs 128a, 128b biasing the legs 131a, 131b into engagement with the side plates 126a, 126b a positive clamping mechanism operated by the adjustment lever 114 could be used so that when the adjustment lever is in a locked state the clamping mechanism is released and when the locking lever 114 is moved to an un-locked state the legs 131a and 131b are clamped to the side plates 126a, 126b.

Figure 7A:
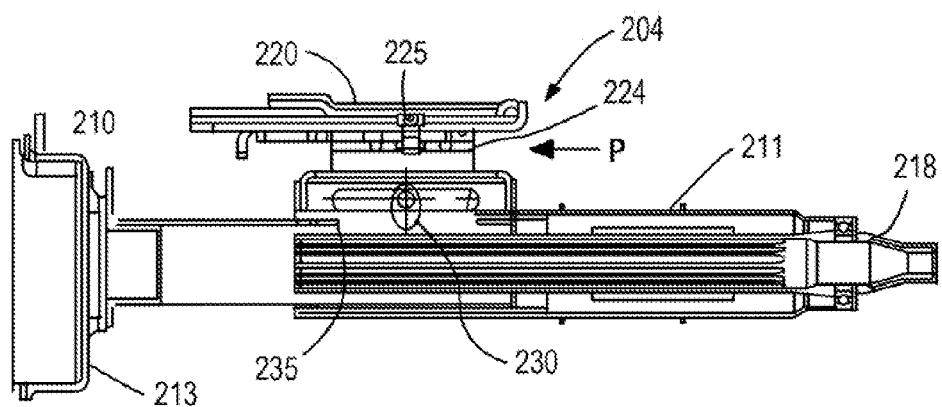
FIG. 7a is a side view of a steering column assembly having a ride down mechanism according to a second embodiment of the invention.
Figure 7B:
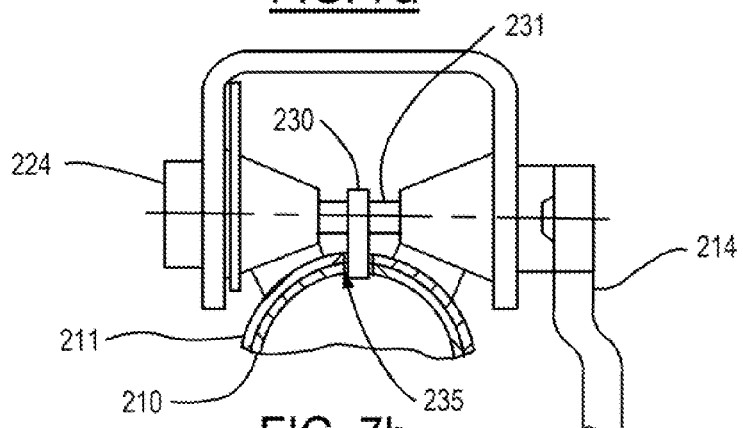

With reference to FIGS. 7a and 7b there is shown a second embodiment of an adjustable steering column assembly having a ride down mechanism constructed in accordance with the invention.

The steering column assembly comprises a tubular lower steering column member 210 which is attached at one end to a bulkhead support 213 and is slidingly engaged at an opposite end with an upper column member 211. The bulkhead support 213 transfers rotary motion from the lower column member 210 to a lower drive shaft (not shown) used to connect the lower column member 210 to a steering rack (not shown). The bulkhead support 213 also resists axial movement of the lower column member 210 if an axial load is applied along a longitudinal axis of the lower column member 210 from a steering wheel (not shown).

An upper drive shaft 218 is drivingly engaged with an upper end of the lower column member 210 by means of a spline drive therebetween. An upper end of the upper drive shaft 218 has, in use, a steering wheel (not shown) fastened thereto and the upper drive shaft 218 is rotatably supported by a bearing located in the upper column member 211.

A ride down mechanism comprising of a mounting plate 220 fastened to part of the body structure of the motor vehicle 1 such as the cross member 3 and a carriage 224 connected to the upper column member 211. A threaded fastener 225 is used to clamp the carriage 224 to the mounting plate 220 so as to permit the carriage to slide relative to the mounting plate 220 when an axial load is applied to the upper column member 211 in a crash so as to effect ride down of the upper column member 211.

An adjustment mechanism similar to that previously described with respect to FIGS. 4 to 6 is incorporated with the ride down mechanism and includes a shaft 231 rotatably supported by the carriage 224 and an adjustment lever 214 attached to the shaft.

A load transfer means in the form of a detent or cam 230 is fastened to the shaft 231 for rotation therewith. The cam 230 is rotatable from a first position when the locking lever 214 is in a position corresponding to a locked state of the adjustment mechanism in which it engages with an aperture or slot 235 in the lower column member 210 to a position corresponding to an un-locked state of the adjustment mechanism in which it is not engaged with the slot 235. It will be appreciated that instead of an aperture or slot the lower column member 210 could have a recess formed in it with which the cam 230 can engage.

That is to say, when the steering column assembly is a telescopically adjustable steering column assembly, the aperture is a slot of sufficient length to permit the upper column member to move throughout a normal range of travel but acting so as to transfer load directly from the upper column to the lower column member when the upper column member reaches either end of its normal range of travel or is an elongate recess of sufficient length to permit the upper column member to move throughout a normal range of travel but acting so as to transfer load directly from the upper column to the lower column member when the upper column member reaches either end of its normal range of travel.

Therefore, when the adjustment mechanism is in its locked state, the load transfer means in the form of the cam 230 has no effect on the operation of the ride down mechanism and ride down can occur by overcoming the clamping force between the mounting plate 220 and the carriage 224 and any friction between the upper and lower column members 211 and 210 and any clamping force between the two column members 210, 211 due to the adjustment mechanism but when the adjustment lever 214 is moved to an unlocked position, the cam 230 is engaged with the slot 235 in the lower column member 210 and any force applied to the upper column member 211 when the upper column 211 has reached its end of adjustment travel is then transferred via the carriage 224 and the shaft 231 directly to the lower column member 210 thereby bypassing the ride down mechanism. It will be appreciated that any force transferred to the lower column member 210 from the cam 230 will be transferred through the lower column member 210 to the bulkhead support 213.

Therefore, controlled collapse of the ride down mechanism is assured without the risk of operator abuse forces affecting the integrity of the ride down mechanism.

Figure 8:
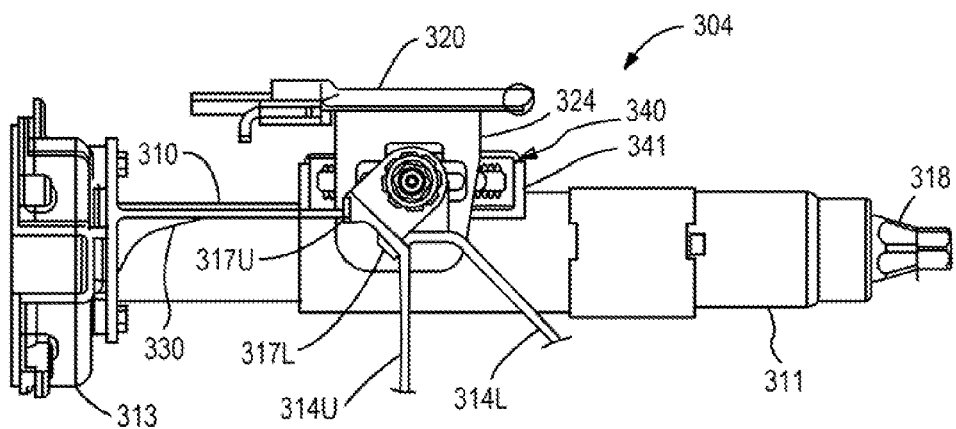
FIG. 8 is a side view of a steering column assembly having a ride down mechanism according to a third embodiment of the invention.

With reference to FIG. 8, there is shown a third embodiment of an adjustable steering column assembly having a ride down mechanism constructed in accordance with the invention.

The steering column assembly comprises a tubular lower steering column member 310 which is attached at one end to a bulkhead support 313 and is slidingly engaged at an opposite end with an upper column member 311. The bulkhead support 313 transfers rotary motion from the lower column member 310 to a lower drive shaft (not shown) used to connect the lower column member 310 to a steering rack (not shown). The bulkhead support 313 also resists axial movement of the lower column member 310 if an axial load is applied along a longitudinal axis of the lower column member 310 from a steering wheel (not shown).

An upper drive shaft 318 is drivingly engaged with an upper end of the lower column member 310 by means of a spline drive therebetween. An upper end of the upper drive shaft 318 has, in use, a steering wheel (not shown) fastened thereto and the upper drive shaft 318 is rotatably supported by one or more bearings (not shown) located in the upper column member 311.

A ride down mechanism comprising of a mounting plate 320 fastened to part of the body structure of the motor vehicle 1 such as the cross member 3 and a carriage 324 connected to the upper column member 311. A threaded fastener (not shown) is used to clamp the carriage 324 to the mounting plate 320 so as to permit the carriage to slide relative to the mounting plate 320 when an axial load is applied to the upper column member 311 in a crash so as to effect ride down of the upper column member 311.

An adjustment mechanism for reach and rake is incorporated with the ride down mechanism and comprises of an operator operable adjustment lever movable between a locked position as indicated by the reference numeral 314L and an unlocked position as indicated by the reference numeral 314U, a rack and pinion locking mechanism 340 including two racks 341 secured to the upper column member 211 and corresponding pinions (not shown) mounted on a shaft rotatably supported by the carriage 324. The adjustment lever 314U, 314L is drivingly connected to the shaft and is held in place by a nut.

Such a rack and pinion locking mechanism is described in U.S. Pat. No. 4,541,298 but it will be appreciated that the invention is not limited to the use of such a locking mechanism for the adjustment mechanism and that any suitable adjustment mechanism could be used.

A load transfer means in the form of a strut 330 is connected to the bulkhead support 313, the strut 330 forms an end stop which is engageable with an abutment surface 317 (indicated as 317U when the adjustment mechanism is in an unlocked state and 317L when the adjustment mechanism is in a locked state) the end stop 330 cannot engage with the abutment surface 317 when the lever 314 is in the locked position/state 314L.

Therefore, if the adjustment mechanism is locked, the load transfer means in the form of the strut 330 has no effect on the operation of the ride down mechanism and ride down can occur by overcoming the clamping force between the mounting plate 320 and the carriage 324 and any friction between the upper and lower column members 311 and 310 and any clamping force between the two column members 310, 311 due to the adjustment mechanism. However, when the adjustment lever 314U is moved to an unlocked position, the strut 330 is engageable with the abutment surface 317U and any force applied to the upper column member 311 when the upper column 311 has reached its end of adjustment travel is then transferred via the carriage 324 and the shaft directly to the bulkhead support 313 thereby bypassing the ride down mechanism.

Although the strut 330 is shown and described in this example as being connected to the bulkhead support 313 it will be appreciated that the strut or another form of end stop could be fastened to some other structural part of the motor vehicle 1.

It will be appreciated that the strut 330 or the flange 317U could be arranged to fail when a force greater than a predetermined force is applied to it so as to facilitate normal functioning of the ride down mechanism in the event of a vehicle crash with the adjustment mechanism in the unlocked state.

Figure 9:
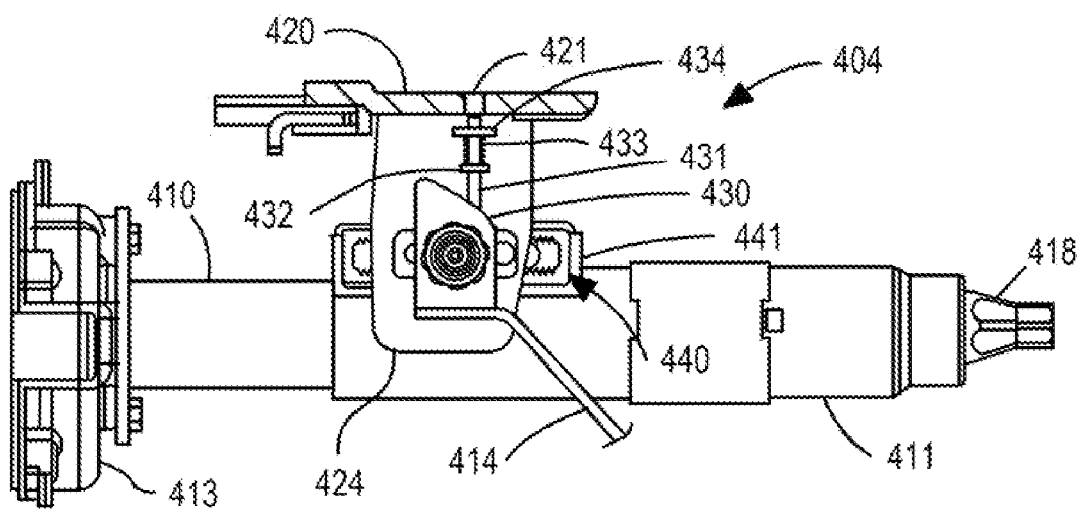
FIG. 9 is a side view of a steering column assembly having a ride down mechanism according to a fourth embodiment of the invention.

With reference to FIG. 9, there is shown a fourth embodiment of an adjustable steering column assembly having a ride down mechanism constructed in accordance with the invention.

The steering column assembly comprises a tubular lower steering column member 410 which is attached at one end to a bulkhead support 413 and is slidingly engaged at an opposite end with an upper column member 411. The bulkhead support 413 transfers rotary motion from the lower column member 410 to a lower drive shaft (not shown) used to connect the lower column member 410 to a steering rack (not shown). The bulkhead support 413 also resists axial movement of the lower column member 410 if an axial load is applied along a longitudinal axis of the lower column member 410 from a steering wheel (not shown).

An upper drive shaft 418 is drivingly engaged with an upper end of the lower column member 410 by means of a spline drive therebetween. An upper end of the upper drive shaft 418 has, in use, a steering wheel (not shown) fastened thereto and the upper drive shaft 418 is rotatably supported by one or more bearings (not shown) located in the upper column member 411.

A ride down mechanism comprising of a mounting plate 420 fastened to part of the body structure of the motor vehicle 1 such as the cross member 3 and a carriage 424 connected to the upper column member 411. A threaded fastener (not shown) is used to clamp the carriage 424 to the mounting plate 420 so as to permit the carriage to slide relative to the mounting plate 420 when an axial load is applied to the upper column member 411 in a crash so as to effect ride down of the upper column member 411.

An adjustment mechanism for reach and rake is incorporated with the ride down mechanism and comprises of an operator operable adjustment lever 414 movable between a locked position as indicated in FIG. 9 and an unlocked position which is rotationally clockwise from the position shown in FIG. 9 and a rack and pinion locking mechanism 440 including two racks 441 secured to the upper column member 411 and corresponding pinions mounted on a shaft rotatably supported by the carriage 424. The adjustment lever 414 is drivingly connected to the shaft and is held in place by a nut. Such a rack and pinion locking mechanism is described in U.S. Pat. No. 4,541,298 but it will be appreciated that the invention is not limited to the use of such a locking mechanism for the adjustment mechanism and that any suitable adjustment mechanism could be used.

A load transfer means is provided in the form of a cam surface 430 formed on the adjustment lever 414 and a detent in the form of a pin 431 supported by a flange 434 on the carriage 424. The pin 431 has a circumferentially extending flange 432 formed on it which provides a reaction surface for a coil spring 433 interposed between the circumferentially extending flange 432 and the flange 434 on the carriage 424. The spring 433 biases the pin against the cam surface 430 at all times.

When the adjustment lever 414 is in a locked position as shown on FIG. 9 the pin 431 is resting against the cam surface 430 and the ride down mechanism operates normally but when the adjustment lever 414 is rotated in a clockwise direction into its unlocked position the effect of the cam surface is to drive the pin 431 upwards against the action of the spring 433 causing it to engage with an aperture 421 in the support plate 420 thereby locking the carriage 424 to the support plate 420. It will be appreciated that instead of an aperture in the mounting plate 420 the pin could abut against a flange attached to the mounting plate 420.

Therefore, if the adjustment mechanism is locked the load transfer means in the form of the strut, pin 430 has no effect on the operation of the ride down mechanism and ride down can occur by overcoming the clamping force between the mounting plate 420 and the carriage 424 and any friction between the upper and lower column members 411 and 410 and any clamping force between the two column members 410, 411 due to the adjustment mechanism but when the adjustment lever 414 is moved to an unlocked position, the pin 430 is engaged with the aperture 421 in the mounting plate 420 and any force applied to the upper column member 411 when the upper column 411 has reached its end of adjustment travel is then transferred via the carriage 424 directly to the mounting plate 420 thereby bypassing the ride down mechanism formed by the slide connection between the carriage 424 and the mounting plate 420.

It will be appreciated that the pin 430 could be arranged to fail when a force greater than a predetermined force is applied to it so as to facilitate normal functioning of the ride down mechanism in the event of a vehicle crash with the adjustment mechanism in the unlocked state.

It will be appreciated by those skilled in the art that although the invention has been described by way of example with reference to one or more embodiments it is not limited to the disclosed embodiments and that one or more modifications to the disclosed embodiments or alternative embodiments could be constructed without departing from the scope of the invention.

The invention claimed is:

1. An adjustable steering column assembly comprising:
   a lower column member slidingly engaged at one end with an upper column member;
   an adjustment mechanism having a locked state in which the upper column member is secured and an unlocked state in which the upper column member can be moved;
   a ride down mechanism engaging the upper column member to permit ride down of the upper column member when a force above a predetermined level is applied to the upper column member, the ride down mechanism comprising;
   a mounting bracket fixed to part of a body structure of a motor vehicle;
   a carriage connected to the upper column member;
   a clamping means to apply a predetermined clamping force between the mounting bracket and the carriage so as to inhibit relative sliding between the carriage and the mounting bracket during normal use but allowing relative movement between the carriage and the mounting bracket when an axial force above a predetermined magnitude is applied to the upper column member in the event of a vehicle crash, the clamping means provides a slidable connection between the carriage and the mounting bracket;
   wherein when the adjustment mechanism is in the unlocked state a load transfer means is engaged to bypass the ride down mechanism to prevent the transfer of axial load from the upper column member through the ride down mechanism during adjustment of the upper steering column member, the load transfer means comprises:
   a retention strap having one end connected to the mounting plate; and
   at least one detent formed at an opposite end that interacts with the carriage and engages with the lower column member when the adjustment mechanism is in the unlocked state so as to prevent relative movement between the carriage and the mounting bracket, the at least one detent being retracted when the adjustment mechanism is in the locked state so as to permit relative movement between the carriage and the mounting bracket when an axial force above the predetermined magnitude is applied to the upper column member in the event of a vehicle crash.

2. An assembly as claimed in claim 1 in which the adjustment mechanism further comprises:
- a shaft rotatably supported by the carriage;
- an operator operable lever connected to the shaft;
- an abutment surface fastened to the shaft for rotation therewith; and
- wherein the at least one detent is in the form of an end stop such that when the operator operable lever is in a position corresponding to the unlocked state the end stop is co-operable with the abutment surface so as to transfer load directly from the upper column member to the end stop and, when the operator operable lever is in a position corresponding to the locked state, the end stop is non-engageable with the abutment surface so as to permit normal ride down to occur.

3. An assembly as claimed in claim 1 wherein the at least one detent is arranged to fail when a force greater than a predetermined force is applied to it so as to facilitate normal functioning of the ride down mechanism in the event of a vehicle crash with the adjustment mechanism in the unlocked state.

4. An Assembly as claimed in claim 1 wherein the adjustment mechanism further comprises:
- a shaft rotatably supported by the carriage;
- an operator operable lever connected to the shaft; and
- wherein the at least one detent is driveably connected to the shaft.

5. An adjustable steering column assembly comprising:
- a lower column member slidingly engaged at one end with an upper column member;
- an adjustment mechanism having a locked state in which the upper column member is secured and an unlocked state in which the upper column member can be moved;
- a ride down mechanism engaging the upper column member to permit ride down of the upper column member when a force above a predetermined level is applied to the upper column member, the ride down mechanism comprising;
- a mounting bracket fixed to part of a body structure of a motor vehicle;
- a carriage connected to the upper column member;
- a clamping means to apply a predetermined clamping force between the mounting bracket and the carriage so as to inhibit relative sliding between the carriage and the mounting bracket during normal use but allowing relative movement between the carriage and the mounting bracket when an axial force above a predetermined magnitude is applied to the upper column member in the event of a vehicle crash, the clamping means provides a slidable connection between the carriage and the mounting bracket;
- wherein when the adjustment mechanism is in the unlocked state a load transfer means is engaged to bypass the ride down mechanism to prevent the transfer of axial load from the upper column member through the ride down mechanism during adjustment of the upper steering column member, the load transfer means comprises:
- a retention strap having one end connected to the mounting plate; and
- at least one detent formed at an opposite end that interacts with the mounting bracket by engaging with a flange formed as part of the mounting bracket and an aperture in the mounting bracket when the adjustment mechanism is in the unlocked state so as to prevent relative movement between the carriage and the mounting bracket, the at least one detent being retracted when the adjustment mechanism is in the locked state so as to permit relative movement between the carriage and the mounting bracket when an axial force above the predetermined magnitude is applied to the upper column member in the event of a vehicle crash.

6. An assembly as claimed in claim 5 in which the adjustment mechanism further comprises:
- a shaft rotatably supported by the carriage;
- an operator operable lever connected to the shaft;
- an abutment surface fastened to the shaft for rotation therewith; and
- wherein the at least one detent is in the form of an end stop such that when the operator operable lever is in a position corresponding to the unlocked state the end stop is co-operable with the abutment surface so as to transfer load directly from the upper column member to the end stop and, when the operator operable lever is in a position corresponding to the locked state, the end stop is non-engageable with the abutment surface so as to permit normal ride down to occur.

7. An assembly as claimed in claim 5 wherein the at least one detent is arranged to fail when a force greater than a predetermined force is applied to it so as to facilitate normal functioning of the ride down mechanism in the event of a vehicle crash with the adjustment mechanism in the unlocked state.

8. An Assembly as claimed in claim 5 wherein the adjustment mechanism further comprises:
- a shaft rotatably supported by the carriage;
- an operator operable lever connected to the shaft; and
- wherein the at least one detent is driveably connected to the shaft.

* * * * *